United States Patent [19]
Koyomogi et al.

[11] Patent Number: 5,379,982
[45] Date of Patent: Jan. 10, 1995

[54] CONTROL VALVE

[75] Inventors: Mutsunori Koyomogi; Yukio Minami; Masahiko Nakazawa; Kazuhiro Yoshikawa; Tetsuya Kojima, all of Osaka, Japan

[73] Assignee: Fujikin Incorporated, Osaka, Japan

[21] Appl. No.: 209,903

[22] Filed: Mar. 14, 1994

[30] Foreign Application Priority Data

May 7, 1993 [JP] Japan .................. 5-107008

[51] Int. Cl.6 .............................................. F16K 49/00
[52] U.S. Cl. ...................................... 251/77; 251/324; 251/63.4; 137/375
[58] Field of Search .................... 251/77, 76, 63.4; 137/375

[56] References Cited

U.S. PATENT DOCUMENTS 3,573,863  4/1971  Doors et al. .................. 137/375

Primary Examiner—Arnold Rosenthal
Attorney, Agent, or Firm—Armstrong, Westerman, Hattori, McLeland & Naughton

[57] ABSTRACT

A control valve comprises a valve body having a fluid channel and a valve seat; a valve operating part; a valve stem supporting member having its upper end fixed to the valve operating part and its lower end fixed to the valve body; a valve stem penetrating the valve stem supporting member and having its upper end part connected to the valve operating part and its lower end part entering the valve body, the valve stem being movable upward or downward by the valve operating part; and a valve element attached to the lower end of the valve stem. The valve element is moved upward or downward by moving the valve stem upward or downward, the valve element being brought into contact with and seated in the valve seat to close a fluid channel as it is moved downward, the valve element being detached from the valve seat to open the fluid channel as it is moved upward. The valve stem comprises an upper bar-shaped member of metal connected to the valve operating member and a lower bar-shaped member made of a fiber reinforced plastic to which the valve element is attached. The upper and lower bar-shaped members are movable upward from a lower end position where the valve element is in a fully open state. The lower bar-shaped member is stop from moving upward at an upper end position where the valve element is in a fully open state. An uppward moving distance of the upper bar-shaped member from a lower end position is made longer than a moving distance of the lower bar-shaped member from the lower end position to the upper end position.

7 Claims, 3 Drawing Sheets

CONTROL VALVE

BACKGROUND OF THE INVENTION

The present invention relates to a control valve.

The terms "upward" and "downward" and like terms as used herein and in the appended claims are merely intended to express the position relation between the components of the control valve as arranged in the drawings showing the embodiment to be described below. These terms should not be interpreted as expressing the absolute "up-down" relation in the state in which the control valve is used.

The control valve comprises a valve body having a fluid channel and a valve seat; a valve operating part; a valve stem supporting member having its upper end fixed to the valve operating part and its lower end fixed to the valve body respectively; a valve stem penetrating the valve stem supporting member and having its upper end part connected to the valve operating part and its lower end part entering the valve body, the valve stem being movable upwardly or downwardly by means of the valve operating part; and a valve element attached to the lower end of the valve stem. The valve element is moved upward or downward by moving the valve stem upward or downward. The valve element is brought into contact with and seated in the valve seat to close the fluid channel as it is moved downward. The valve element is detached from the valve seat to open the fluid channel as it is moved upward.

Conventionally, this type of control valve has the valve stem integrally formed by metal.

However, in the conventional control valve having the entire valve stem integrally formed by metal, when a fluid in a low temperature or in a high temperature flows through the fluid channel of the valve body, heat inflows or outflows through the valve stem between the valve operating part and the fluid, and consequently entailing a problem wherein the fluid alters its temperature.

SUMMARY OF THE INVENTION

The object of the present invention is to solve the above mentioned problem and to provide a control valve wherein heat does not inflow or outflow through the valve stem between the valve operating part and the fluid.

The control valve of the present invention comporises a valve body having a fluid channel and a valve seat; a valve operating part; a valve stem supporting member having its upper end fixed to the valve operating part and its lower end fixed to the valve body respectively; a valve stem penetrating the valve stem supporting member and having its upper end part connected to the valve operating part and its lower end part entering the valve body, the valve stem being movable upwardly or downwardly by means of the valve operating part; and a valve element attached the lower end of the valve stem. The valve element is moved upward or downward by moving the valve stem upward or downward. The valve element is brought into contact with and seated in the valve seat to close the fluid channel as it is moved downward. The valve element is detached from the valve seat to open the fluid channel as it is moved upward. The valve stem comprises an upper bar-shaped member connected to the valve operating member and a lower bar-shaped member to which the valve element is attached, the two tubular bodies being movable upward from a lower end position where the valve element comes to be in a fully closed state, the lower bar-shaped member being stopped from moving upward at an upper end position where the valve element comes to be in a fully open state, an upward moving distance of the upper bar-shaped member from a lower end position being made longer than a moving distance of the lower bar-shaped member from the lower end position to the upper end position.

In the control valve of the present invention, the lower bar-shaped member and the upper bar-shaped member can be separated because the upper bar-shaped member can be moved upward after the valve element comes to be in the fully open state where the upper bar-shaped member stops at the upper end position. Therefore, heat is prevented from flowing between the two tubular bodies. As a result, when a fluid is a high temperature or a fluid in a low temperature flows through the fluid channel of the valve case, the fluid is prevented from altering its temperature.

The present invention will be described in more details with reference to the accompanying drawings.

DESCRIPTION OF THE PREFERRED EMBODIMENT

Figure 1:
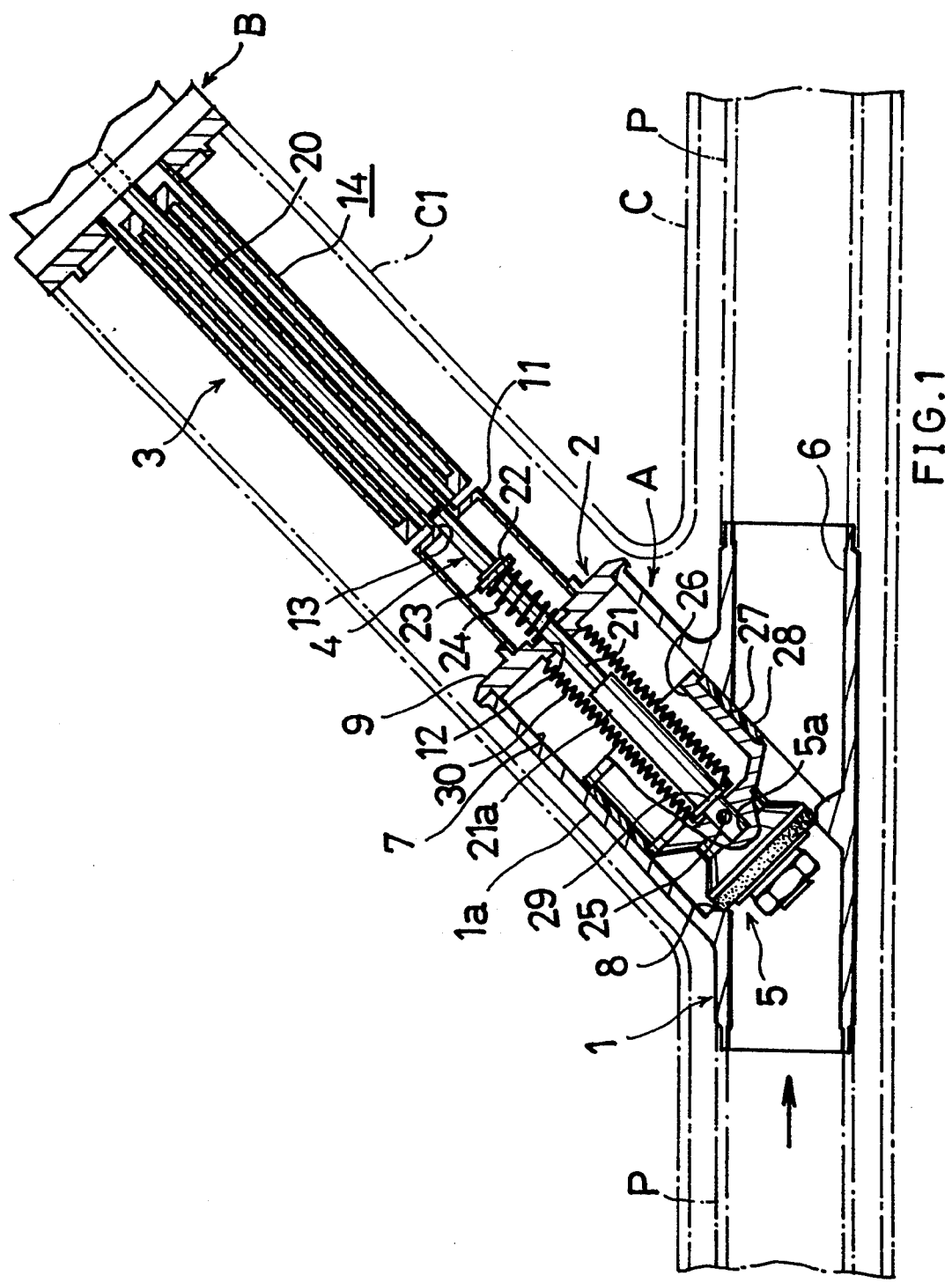
FIG. 1 is a view in vertical section showing the overall construction when the valve element of the control valve of the present invention is in a fully closed state.
Figure 2:
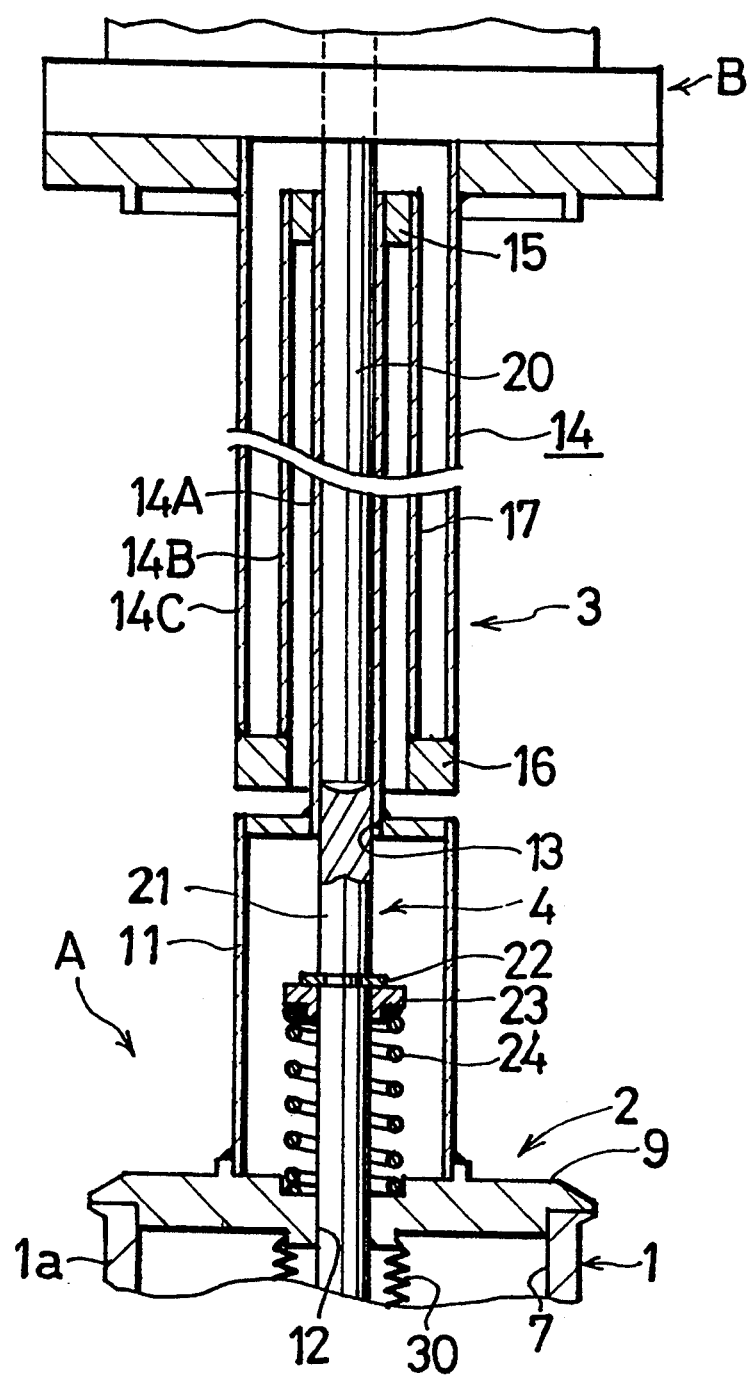
FIG. 2 is a partially enlarged view omitting a part of FIG. 1.
Figure 3:
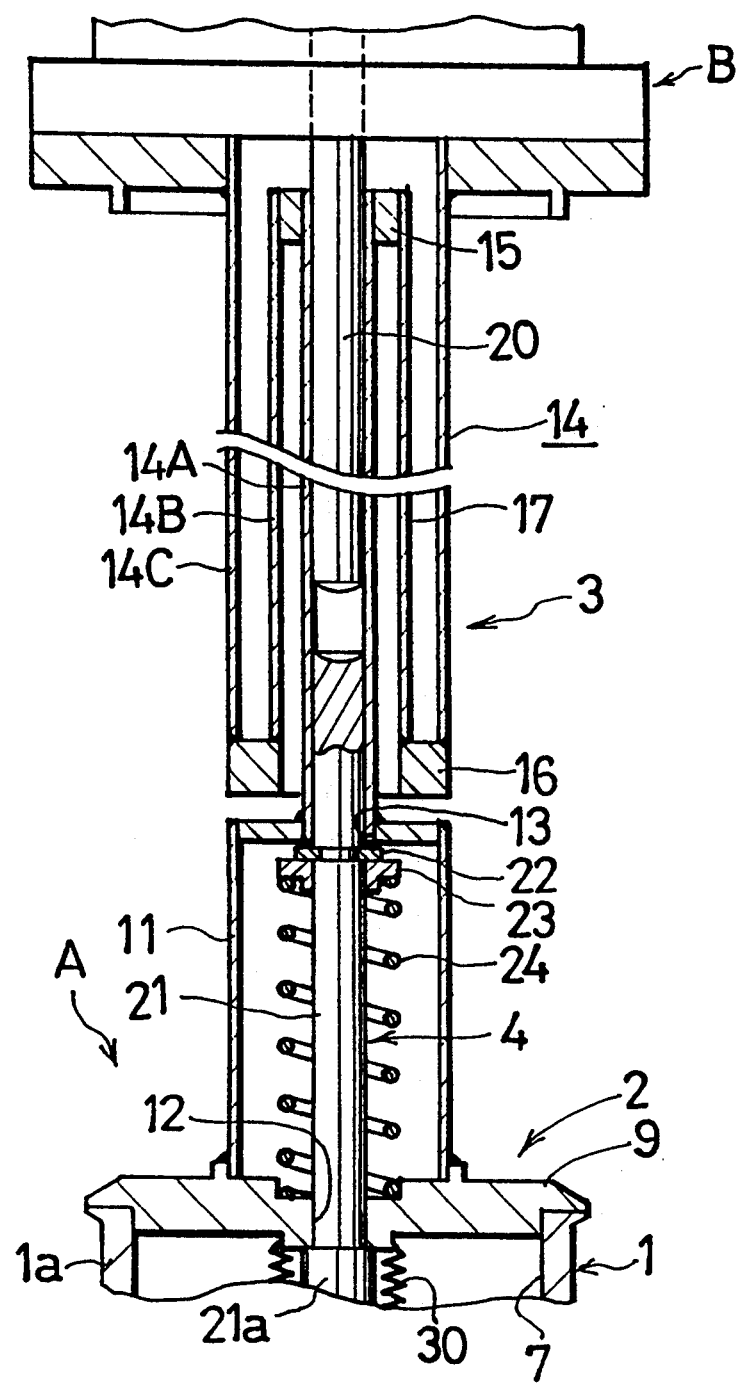
FIG. 3 is a view corresponding to FIG. 2 when the valve element is in a fully open state.

FIG. 1 shows the overall construction of a control valve, and FIG. 2 and FIG. 3 show the main portion of the same in greater detail.

In FIG. 1, the control valve comprises a valve body (A), a valve operating part (B), a valve stem supporting member (3) having its upper end fixed to the valve operating part (B) and its lower end fixed to the valve body (A), a valve stem (4) penetrating the valve stem supporting member (3) and having its upper end part connected to the valve operating part (B) and its lower end part entering the valve body (A), and a valve element (5) attached to the lower end of the valve stem (4).

The valve body (A) comprises a valve case (1) and a valve closure (2) which is fixed to the valve case (1). The valve case (1) is provided with a fluid channel (6) extending from one side to the other side thereof. A fluid pipe (P) is connected to each side of the valve case (1). The fluid pipe (P) is covered with a heat insulating cover (C). The Valve case (1) has an inclined cylindrical part (1a) integrally formed and projecting upward, the cylindrical part (1a) having a valve stem bore (7) extending longitudinally from an upper end face thereof, the lower end part of the bore (7) being open to the fluid channel (6). The valve case (1) is formed with an inclined valve seat (8) facing upward and extending from an upper wall to a lower wall thereof.

The valve closure (2) is fixed to the upper end of the cylindrical part (1a) of the valve case (1). The valve closure (2) comprises a disk-like part (9) closing the upper end opening of the valve stem bore (7) and an inclined cylinder-like part (11) extending upward, the cylinder-like part (11) having a closed upper end and an open lower end, the circumferential part of the open lower end being fixed to the upper face of the disk-like part (9). The disk-like part (9) is provided with a valve stem guide hole (12) in its center. The closed upper end wall of the cylinder-like part (11) is provided with a through hole (13) in its center.

As shown in FIG. 2, the valve stem supporting member (3) consists of a triple tube (14) made of metal. Three tubes (14A), (14B), (14C) composing the triple tube (14) are spaced apart one another. The lower end of an innermost tube (14A) (lower tubular body) among the three tubes (14A), (14B), (14C) is inserted into the through hole (13) in the closed upper end wall of the cylinder-like part (11) of the valve closure (2) and fixed by welding. The upper end of this tube (14A) is separated from the valve operating part (B). The upper end of an outermost tube (14C) (upper tubular body) among all the tubes (14A)-(14C) composing the triple tube (14) is fixed to the valve operating part (B). The lower end of this tube (14C) is separated from the valve body (A). The upper end and the lower end of the center tube (14B) among all the tubes (14A)-(14C) composing the triple tube (14) are respectively separated from the valve operating part (B) and the valve body (A). The upper end of this tube (14B) is connected to the upper end of the innermost tube (14A) by a connecting ring (15), and the lower end of the tube (14B) is connected to the lower end of the outermost tube (14C) by a connecting ring (16). The couple of tubes (14A), (14B) and the connecting ring (15) are welded together, and so are the other couple of tubes (14B), (14C) and the connecting ring (16). Therefore, a connecting member (17) which connects the upper end of the innermost tube (14A) to the lower end of the outermost tube (14C) comprises the connecting ring (15), the center tube (14B) and the connecting ring (16).

The valve closure (2) and the valve stem supporting member (3) are surrounded by a cylindrical part (C1) provided on the heat insulating cover (C).

The valve stem (4) comprises an upper bar-shaped member (20) made of metal and a lower bar-shaped member (21) made of fiber reinforced plastic. Incidentally, the lower bar-shaped member (21) is not limited to a fiber reinforced plastic made, but it may be made of other plastic or metal. The upper bar-shaped member (20) has its upper end connected to the valve operating part (B) and its lower end slidably inserted into the innermost tube (14A), the member (20) being made movable upwardly or downwardly by the valve operating part (B). The lower bar-shaped member (21) slidably penetrates the valve stem guide hole (12), the upper end thereof being slidably inserted into the innermost tube (14A) and movable upwardly or downwardly. Therefore, the lower bar-shaped member (21) is pushed by the upper bar-shaped member (20) to move downward when the member (20) is moved downward.

As shown in FIG. 2, a retaining ring (22) is fixed to the lower bar-shaped member (21) inside the cylinder-like part (11) of the valve closure (2), and a spring seat (23) is upwardly or downwardly movably fitted around a portion of the lower bar-shaped member (21) below the retaining ring (22). A compression coil spring (24) (an elastic member) is arranged around the lower bar-shaped member (21) between the upper face of the disk-like part (9) of the valve closure (2) and the spring seat (23). The repulsive force of the compression coil spring (24) is transmitted to the lower bar-shaped member through the spring seat (23) and the retaining ring (22) so that the lower bar-shaped member (21) is always urged upward. Consequently, the lower bar-shaped member (21) is raised by the repulsive force of the compression coil spring (24) when the upper bar-shaped member (20) is raised.

The lower bar-shaped member (21) is provided with a large diameter part (21a) of a prescribed length inside the valve stem bore (7) of the cylindrical part (1a) of the valve case (1). A portion of the lower bar-shaped member (21) below the large diameter part (21a) is fitted in a hole (5a) provided on the upper face of the valve element (5), the portion being fixed to the valve element (5) by a pin (25). Then, the lower bar-shaped member (21) is adapted to move upwardly or downwardly within a prescribed distance between a lower end position and an upper end position, the lower end position being a position where the valve element (5) is brought into contact with and seated in the valve seat (8) to be in a fully closed state, the upper end position being a position where the large diameter part (21a) is abutted on the disk-like part (9). In the upper end position, the valve element (5) is detached from the valve seat (8) to be in a fully open state.

When the lower bar-shaped member (21) is in the lower end position, the upper bar-shaped member (20) is also in the lower end position beyond which the member (20) does not descend further. The upward moving distance of the upper bar-shaped member (20) from the lower end position is made longer than the moving distance of the lower bar-shaped member (21) from the lower end position to the upper end position.

An inclined cylindrical portion (26) projecting upward is integrally formed around the circumferential part of the valve element (5). A shallow circular groove (27) is provided on an outer circumferential surface of the cylindrical portion (26). A cylindrical plastic guide (28) is fitted in this circular groove (27), the guide (28) being made of a synthetic resin, for example, a fluorinated resin, the guide (28) being slidable along an inner circumferential surface of the cylindrical part (1a) of the valve case (1). A ring (29) is fixedly fitted around the upper end of a portion projecting upward from the hole (5a) disposed below the large-diameter part (21a) of the lower bar-shaped member (21). The upper and lower ends of the bellows (30) are tightly fixed to the disk-like part (9) of the valve closure (2) and the ring (29) respectively so that the bellows (30) hermetically seal a space therebetween.

When the upper bar-shaped member (20) of the valve stem (4) is moved downward by the valve operating part (B), the lower bar-shaped member (21) and the valve element (5) are pushed by the upper bar-shaped member (20) to move downward against the repulsive force of the compression coil spring (24). The valve element (5) is brought into contact with and seated in the valve seat (8) to close the fluid channel (6) as it is moved downward. In the fully closed state of the valve element (5), the upper end surface of the lower bar-shaped member (21) and the lower end surface of the upper bar-shaped member (20) are abutted each other. The amount of heat transmitted through the valve stem (4) is reduced between the fluid inside the fluid channel (6) and the valve operating part (B) by means of the lower bar-shaped member (21) made of fiber reinforced plastic. In addition, the path of heat transmitted through the valve stem supporting member (3) becomes long since the supporting member (3) comprises a triple tube (14) made of metal, the innermost tube (14A) having its lower end fixed to the valve closure (2) and its upper end separated from the valve operating part (B), the outermost tube (14C) having its upper end fixed to the valve operating part (B) and its lower end separated from the valve body (A), the upper end of the innermost tube (14A) and the lower end of the outermost tube (14C) being connected by the connecting member (17). Consequently, the amount of heat transmitted through the valve stem supporting member (3) is reduced between the fluid inside the fluid channel (6) and the valve operating part (B).

When the upper bar-shaped member (20) of the valve stem (4) is moved upward by the valve operating part (B), the lower bar-shaped member (21) and the valve element (5) are moved upward by the repulsive force of the compression coil spring (24). The valve element (5) is detached from the valve seat (8) to open the fluid channel (6) as it is moved upward. When the lower bar-shaped member (21) is moved upward and the valve element (5) is in the fully opened state, the upper end of the large diameter part (21a) of the lower bar-shaped member (21) comes abutted on the disk-like member (9), the lower bar-shaped member (21) having reached the upper end position, the lower bar-shaped member (21) and the valve element (5) being stopped at this position. Subsequently, the upper bar-shaped member (20) is moved further upward by the valve operating part (B) so as to be detached from the lower bar-shaped member (21) (See FIG. 3). Thus, when the control valve is fully opened, the heat is prevented from flowing through the valve stem (4) between the fluid in the fluid channel (6) and the valve operating part (B). Further, similarly to the above-mentioned fully closed state, the amount of heat transmitted through the valve stem supporting member (3) is also reduced between the fluid in the fluid channel (6) and the valve operating part (B) in this fully opened state.

What is claimed is:

1. A control valve comprising:
   a valve body having a fluid channel and a valve seat;
   a valve operating part;
   a valve stem supporting member having its upper end fixed to the valve operating part and its lower end fixed to the valve body;
   a valve stem penetrating the valve stem supporting member and having its upper end part connected to the valve operating part and its lower end part entering the valve body, the valve stem being moved upward or downward by the valve operating part; and
   a valve element attached to the lower end of the valve stem;
   the valve element being moved upward or downward by moving the valve stem upward or downward, the valve element being brought into contact with and seated in the valve seat to close the fluid channel as the element is moved downward, the valve element being detached from the valve seat to open the fluid channel as the element is moved upward, characterized in that the valve stem comprises an upper bar-shaped member connected to the valve operating member and a lower bar-shaped member to which the valve element is attached, the upper and lower bar-shaped members being movable upward from a lower end position where the valve element comes to be in a fully closed state, the lower bar-shaped member being stopped from moving upward at an upper end position where the valve element comes to be in a fully open state, an upward moving distance of the upper bar-shaped member from a lower end position being made longer than a moving distance of the lower bar-shaped member from the lower end position to the upper end position.

2. A control valve as defined in claim 1, further comprising an elastic member for urging the lower bar-shaped member upward.

3. A control valve as defined in claim 1, wherein at least one of the upper bar-shaped member and the lower bar-shaped member is made of a plastic.

4. A control valve as defined in claim 3, wherein the plastic is a fiber reinforced plastic.

5. A control valve as defined in claim 1, wherein the valve body comprises a valve case having the fluid channel and a valve closure fixed to the valve case, the valve case being provided with a cylindrical part projecting upward, the cylindrical part having a valve stem bore extending longitudinally from an upper end face thereof, the lower end part of the bore being open to the fluid channel, the valve closure comprising a disk-like part and a cylinder-like part, the disk-like part being fixed to the cylindrical part of the valve case and closing the upper end opening of the valve stem bore, the cylinder-like part having a closed upper and an open lower end and extending upward, said open lower end having its circumferential part fixed to the upper face of the disk-like part, the disk-like part being provided with a valve stem guide hole, the lower bar-shaped member of the valve stem being guided by the guide hole to be movable upward or downward, the lower bar-shaped member being provided with a large diameter member inside the valve stem bore, the lower bar-shaped member having its lower end position where the upper end of the large diameter member is abutted on the disk-like part.

6. A control valve as defined in claim 5, wherein an elastic member for urging the lower bar-shaped member upward is provided between the upper face of the disk-like part and a portion fixedly provided on the lower bar-shaped member above said upper face.

7. A control valve as defined in claim 1, wherein the valve stem supporting member comprises an upper tubular body and a lower tubular body, the upper tubular body having its upper end fixed to the valve operating member and its lower end separated from the valve body, the lower tubular body having its lower end fixed to the valve body and its upper end separated from the valve operating member, the two tubular bodies being fitted to be spaced apart each other, the lower end of the upper tubular body and the upper end of the lower tubular body being connected by a connecting member.

* * * * *